United States Patent Office 3,479,299
Patented Nov. 18, 1969

3,479,299
CARBON BASED CATALYSTS AND COMPOSITIONS PRODUCIBLE THEREFROM
Donald Rivin, Framingham, Mass., and Jerome Aron, Providence, R.I., assignors to Cabot Corporation, Boston, Mass., a corporation of Delaware
No Drawing. Filed Oct. 22, 1965, Ser. No. 502,474
Int. Cl. C01b 31/12; C08c 11/18
U.S. Cl. 252—426                                    30 Claims

ABSTRACT OF THE DISCLOSURE

The present invention provides novel catalytic carbons, carbon based compositions and processes for the production thereof. Broadly speaking, the catalytic carbons of the present invention comprise carbon particles, such as carbon black, the surfaces of which have been treated so as to provide electron rich (anion) sites thereon associated directly with carbon atoms. The production of such catalytic carbon is effected by treating carbon particles with strong Lewis base compounds in an organic solvent medium. The resulting anion-site-containing carbon catalyst can then be reacted with various compounds comprising electrophilic organic radicals to form stable carbon based compositions.

---

It has been known that carbon blacks could be modified by subjecting them to chemical treatments whereby chemicals would be selectively adsorbed upon the surface of the carbon black. Such processing techniques were, of course, limited by the physics of the adsorption process, for example groups had to have particular physical characteristics to be properly adsorbed onto the surface of carbon or groups had to have a particular size in order to be absorbed into the pores of a carbon particle. Thus, there was little versatility in the processes formerly known to the art, each process being applicable only to impart a limited number of useful properties to the carbon being treated.

Applicants, however, have now discovered that, under certain controlled conditions, carbonaceous materials like carbon black can be reacted directly with a very wide range of chemical radicals. This discovery has important implications in that selected chemical groups may be added to carbon black surfaces quite independent of the absorbing or adsorbing characteristics which carbon black has for the particular group being added. Thus, even polymerizable radicals can be added to carbon black and, indeed, polymers can be prepared incorporating carbon black crystallites or having carbon black crystallites as their terminals.

Such polymers are of high interest in experimental work relating to the nature of carbon black-elastomer bonding, the abrasion of filled elastomers, etc. Furthermore, since various polar and non-polar organic chemical groups of basic or acidic character can be added to carbon black according to the process of the instant invention, blacks can be so modified to disperse rapidly and under optimum conditions in a wide variety of dispersion media such as are used in the preparation of plastics, elastomers, lacquers, inks, etc. Still further, such blacks may be used as scavengers for destroying residual catalyst in elastomers with which the black is compounded. Such carbon blacks may also be used directly as catalysts as for example in polymerization of some monomers with which the black has been compounded. Furthermore, the blacks of the invention may be used as oxidation inhibitors. Moreover, as will be discussed in more detail hereafter, the process of preparing chemically-substituted carbon blacks of the invention includes the preparation of a novel and active catalytic carbon black material which has a variety of uses in the chemical arts including catalysis of anionic-type polymerization reactions.

Other utility for such chemically modified carbon blacks exists in the field of elastomer and plastic reinforcement and pigmentation. For example, aminated carbon blacks in materials like polybutadiene, natural rubber, and butyl rubbers modify the modulus and torsional hysteresis of such materials. Various hydrocarbon groups attached to carbon blacks have utility in modifying these same properties, as do carbon blacks modified with sulfur-bearing groups. Furthermore substituted carbon blacks can be used alone or in composition with other materials such as silica to form ablative structures useful in rocket applications and the like.

Therefore it is an object of the invention to provide a process whereby chemical substituents may be selectively added to carbon black.

It is another object of the invention to provide carbon blacks having properties modified by the direct substitution thereon with any of various chemical groups.

It is another object of the invention to prepare polymers comprising carbon black crystallites.

It is still another object of the invention to provide carbon black which may be most easily dispersed in lacquers, solvents and the like.

It is a further object of the invention to provide catalytic materials based on carbon black.

It is a further object of the invention to prepare carbon blacks which, in effect, "carry their own dispersing agent with them."

It is another object of the invention to provide polymers having carbon black in direct chemical linkage therewith and a process for preparing same.

It is another object of the invention to provide processes utilizing a carbon black-based anion as a polymerization catalyst.

Applicants have substantially attained the aforementioned objects by a process wherein carbonaceous materials such as lamp black, charcoal, or carbon black are reacted with a strong Lewis base such as an alakali metal amide like sodium amide, sodium hydride, lithium aluminum hydride, triphenyl methyl sodium, and the like to form relatively negative sites (henceforth called anion sites) on carbon black crystallites. Thereupon the negatively charged carbon black, henceforth referred to as the "carbon anion," is reacted with an organic compound of the formula RX (wherein X is an electronegative atom or group such as a halogen and R is an electrophilic organic radical) to form a carbon black characterized by a surface represented by the formula

represents the surface of a carbon black crystallite. These reactions conveniently take place in an organic solvent medium and preferably in solvating ethers such as 1,2-dimethoxyethane, tetrahydrofuran, and other such solvating ethers which stabilize carbanions without reaction therewith. 1,2-diethoxyethane, dimethyl ether and dioxane are additional members of this preferred group of solvents. However, other organic solvents including both aromatic and aliphatic compounds are also useful as media for carrying out the process of the invention. For example, aromatics such as toluene, acetonitrile, aliphatics such as hexane, dimethylsulfoxide, and hexamethylphosphonamide are useful and indicative of the wide scope of organic solvents conveniently used in the practice of the invention.

The process of the invention may be exemplified by the following sequential reactions:

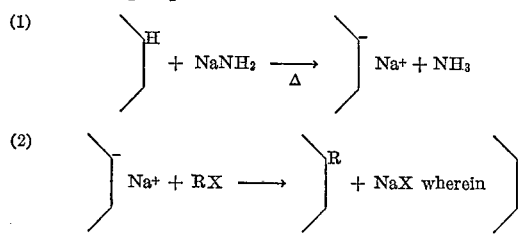

is representative of a carbon black surface, NaNH₂ is a typical strong base and RX is an organic compound as described above. Advantageously at least $1 \times 10^{-5}$ anion sites are present for each gram of carbon treated.

Reactions of the carbon-anion such as those with carbon disulfide, with the sulfur-alkyl bromide combination, and with monomers wherein monomer addition at the anion site is realized are believed to have a somewhat different reaction mechanism than that described in Equations 1 and 2 above. These are illustrated by reactions (3), (4) and (5) respectively:

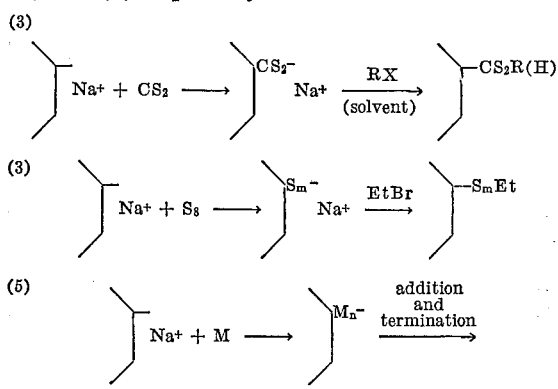

Formation of the carbon-anion is advantageously carried out in an organic solvent under anhydrous conditions at elevated temperatures, most conveniently at the reflux temperature of the solvent being utilized. The reaction is conveniently carried out from 2 to 20 hours.

Reaction of the carbon-anion with various chemicals can be carried out over a wide range of temperatures depending upon the reaction rates obtainable at various temperatures. In any case the temperature should be high enough so the reaction proceeds at an economically useful rate but at a sufficiently low rate to avoid the necessity of utilizing a large cooling capacity with the apparatus in which the reaction is to be carried out. Reflux temperatures, once again, are commonly employed except in polymerization reactions where lower temperatures are desired.

It is often advantageous to carry out the carbon-anion reaction in a solvating ether like dimethoxy ethane or tetrahydrofuran but then to carry out the reaction of the carbon-anion with the organic reactant in a different solvent. Particularly advantageous results, for example, have been achieved by methylating the carbon-anion in organic solvents like dimethylsulfoxide after having formed the carbon anion in a solvating ether.

The carbon black used in the process of the invention preferably contains a considerable amount of hydrogen along the edge sites of its crystallites. This hydrogen, as seen in the illustrative equations above, is removed by action of the strong base leaving an anion site. The anion site is then occupied by the organic radical defined as R above. Some other groups, for example the methyl group, may also be removed under conditions favorable for anion formation but usually carbon blacks with significant quantities of such other groups rather than hydrogen are not economically useful in the process of the invention.

Among the vast number of compounds, RX, useful in the practice of the invention are ethyl bromide, octyl bromide, alkyl bromide, bromoethylamine, chloroacetic acid, carbon disulfide, S and $C_2H_5Br$ together, chloroacetone, chloroacetonitrile, chloroacetamide, p-chlorothiophenol, chloropropionic acid, benzyl chloropropionic acid, cyanogen bromide, methyl iodide, ethylene chlorohydrin and the like.

However, it must be clearly understood that this list is presented only for the purposes of quickly illustrating the scope of the invention. The reactants listed are only a very small proportion of those which may be reacted with the carbon radical-anion to form unique chemical materials by the instantly disclosed method. Those skilled in the art will be able to select a large number of compounds in view of this disclosure of exemplary compounds and further disclosures incorporated in this application.

For example, some additional substituents which may be added to the anion site are hydroxyl and mercaptan-bearing radicals, amino-containing radicals, radicals containing ether linkages, nitrile type radicals and amido radicals. Aryl radicals may also be chemically attached to the carbon anion. Moreover, the carbon anion can be reacted with halo-substituted ureas like 1,2-diethyl carbonyl chloride and salts like chloroethyl sulfonate. Further substituents can be used. Unsaturated groups may be added to the carbon anion by reacting such materials as allylic halides, crotonic halides and other halo-olefins therewith.

Hydroxyl group-containing substituents may be conveniently added to the carbon anion by reaction of halogenated alkyl alcohols like chloropropanol, ethylene chlorohydrin, chlorohexanol, bromobutanol and the like. Mercaptan group-containing substituents can be added in the same general manner as will be obvious to those skilled in the art on reading the instant disclosure.

Acid group-containing substituents may be added by reacting such acids as o-chloro benzoic acid, bromopropionic acid, chloroacetic acid, and like organic acids with the carbon anion. The alkali metal salts of these acids are often more conveniently used in the process of the invention than the free-acid form thereof. Here too, analogous halogenated sulfur-containing acids such as mercapto and thiol acids may be used as a means for producing products of the invention.

Amino group-containing radicals may be added by reacting halogenated amines like bromoethylamine, chlorotriethylamine, halogenated diamines like

Primary, secondary, tertiary or quaternary amines may be used.

Ether and carbonyl containing groups may also be added by reacting any of a wide range of halogenated compounds like epichlorohydrin, chlorinated ketones such as chloroacetone, mono-chlorinated ethyl ether and the like.

Halogenated nitriles like chloromethylnitrile and chloroethylnitrile may be reacted with the carbon anion to form nitrile-substituted carbon compositions.

Halogenated amides such as chloroacetamide and the chloroalkyl homologs thereof can be reacted with the carbon anion to form a series of amidized carbon black materials.

Moreover, the direct aryl substitution of the carbon black may be obtained by reacting such aromatic compounds as 1-chloro-2,4-dinitrobenzene and 1,4-dichlorobenzene, parachloroaniline, and 1-chloro-2,4-dinitronaphthalene with the carbon anion.

Thus, it is clear that almost a limitless number of halogenated alkyls and halogenated substituted alkyls can be reacted with the carbon anion to form novel materials which have substantially different chemical properties than the properties of carbon blacks heretofore known to the art.

As will be obvious to those skilled in the art on reading this specification, it is only necessary to limit the use of acidic material which material would donate an anion-terminating proton or the equivalent to the carbon-anion material. And, of course, kinetic and steric considerations will make some compounds so slightly reactive with the carbon anion that no economically advantageous reaction may be obtained. However, it is to be understood that there is no intention to limit the disclosure of useful reactants to halogenated materials. Other chemicals can be selected from those groups of chemicals, suggested by the above disclosure which will be recognized by those skilled in the art as capable of forming anions other than halogen anions, which anions are removable therefrom by the process of the invention. Among such other chemicals will be those having instead of an active halogen, an ionizable sulfate, nitrate or hydroxyl group or the like.

Among polymers that may be formed by a process of the invention may be those attached directly to the carbon-anion sites of the carbon black with monomers. In general, monomer units useful for forming said polymers are those containing electronegative heteroatoms in cyclic systems where carbon bond formation with the carbon anion is energetically favored over electron transfer from the carbon anion to the monomeric unit. Monomers like ethylene oxide; propylene oxide; ethylene imine; cyclic sulfides, especially vicinal episulfides, like ethylene sulfide, propylene sulfide and butylene sulfide, cyclic siloxanes such as hexamethylcyclotrisiloxane and the like are advantageously used. Ethylene oxide is particularly advantageous. Average polymer chains of up to 10,000 and more can be achieved.

Some such monomers may be described as being of the formula:

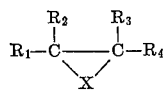

wherein X is a hetero atom contributing some forming, with vicinal carbon atoms, a heterocyclic group, $R_1$, $R_2$, $R_3$ and $R_4$ may be any non-interfering or non-contaminating radical such as hydrogen, aryl or alkyl groups. Preferably $R_1$, $R_2$, $R_3$ and $R_4$ will be hydrogen or lower alkyl groups such as those having from 1 to 6 carbon atoms but wherein the total number of such carbon atoms does not exceed about 15. Use of larger molecular weight compounds usually result in excessive steric hindrance of the reaction.

The carbon anion formed by the reaction of carbon and strong base may also be used as a catalyst in numerous other polymerizations of vinyl-type monomers which are known to those skilled in the art as being promoted normally by anionic catalysis, for example the polymerization and copolymerization of acrylonitrile, butadiene, isoprene, methyl methacrylate, styrene and the like. In most of these anionic polymerizations, the function of the carbon-anion is primarily catalytic and the polymers have very little if any carbon black incorporated chemically therein.

A third type of polymer formable by utilizing the aforesaid carbon anion is that type in which a monomer such as ethylene oxide is first reacted with the carbon black anion to give an anion species which may be represented as

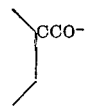

wherein the anion site is occupied by, and the anion function is preserved by, the presence of the residue of the monomer. The formation of this species is the same as would be achieved at the outstart in preparing the carbon black-ethylene oxide type of polymer referred to above. However, in this instance, instead of continuing with the addition of more heterocyclic monomer, a monomer susceptible to anionic polymerization such as acrylonitrile is added to form a polymer represented by:

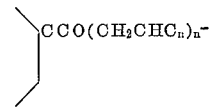

Thus anionic copolymerization can generally be carried out to form copolymers wherein the monomeric unit attached to the carbon black is of electronic nature such as that described above and preserved by the aforesaid vicinal heterocyclic-type monomers. In this type of polymerization, very high molecular weights may be achieved.

Termination of those aforementioned polymers which include carbon black crystallites chemically bonded thereto may be accomplished by protonation or reaction with suitable other compounds capable of forming a positively charged radical for terminating similar reactive polymeric sites. Among the convenient compounds used interminating such polymers are alkyl halides like methyl iodide, bromoethylamine, methyl alcohol, acetic acid and the like.

In order to point out more fully the nature of the present invention, the following specific examples are given as illustrative embodiments of the process and products produced thereby.

The data set forth in the following examples sometimes refers to "total acid" or "strong acid" analysis. The "strong acid" analysis is obtained by the following procedure:

Two grams of dry carbon black are weighed into an 8 ounce bottle and shaken therein for four hours in the presence of 50 ml. of an aqueous solution of 0.1 normal sodium bicarbonate. At the end of this period, the black is centrifugally separated off and 25 ml. of supernatant liquid is transferred into a 250 ml. Erlenmeyer flask containing about 30 ml. of distilled water and a small quantity of boiling beads. Also added to this flask is 50 ml. of 0.05 normal HCl. The contents of the flask are then boiled for twenty minutes to remove any carbonic acid present; then the contents are cooled.

The resultant liquid is back-titrated with 0.02 sodium hydroxide to neutrality as determined by a phenolphthalein end point. Then a blank run is made by performing the above steps with no carbon black.

Thereupon it is possible to determine the quantity of strong acid sites in terms of milliequivalents of acidic group per gram of carbon black by the following relation:

$$\frac{2(\text{normality of NaOH}) \ 50 \text{ ml.}-\text{ml. of NaOH used for blank}}{\text{grams of carbon black}}$$

The aforementioned "total acid" analysis is obtained by the following procedure:

A sample of the carbon black to be tested is dried in a reaction flask for an hour between 230 and 250° F. under a pressure of less than 0.1 mm. Hg absolute. The flask is then filled with a dry inert gas such as nitrogen and allowed to come to room temperature, i.e. about 20 to 40° C. Thereupon a dilute solution of lithium aluminum hydride in bisethoxyethane is reacted with the black. After the first surge or hydrogen evolution, the sample is heated to 70° C. and stirred for an hour. The total hydrogen evolved over the above period of an hour is utilized as a measure of total acidic hydrogen.

Example 1.—Preparation of a carbon anion and methylation thereof

A 500 ml., three neck flask was fitted with a mechanical agitator, gas inlet line and a gas outlet line containing a reflux condenser and, more remote from the flask, a mercury bubbler trap.

Into the flask were charged 10.0 grams of channel black, 4.0 grams of sodium amide and 200 ccs. of dimethoxyethane which had been dried over sodium. The resulting mixture of ingredients was refluxed for 13 hours under a dry nitrogen atmosphere. Thereafter 30 ccs. of $^{14}$C-labeled methyl iodide are added dropwise to the flask over a 30 minute period. After this addition has been completed the contents of the flask were refluxed for another one-half hour at the end of which time 15.0 ccs. of water are added dropwise over 15 minutes to hydrolyze excess sodium amide.

The solid product in the flask was filtered, washed thoroughly with a water-alcohol mixture, and dried to constant weight at 100° C. in a forced draft oven.

A methyl content of 0.972 milliequivalents of —CH$_3$ per gram of carbon black was determined by radioactive counting, an analysis for elemental hydrogen, and mass spectral analysis of the vapor pyrolysis products of the black for methane and ethane.

Example 1a.—Solvent variation

The same procedure (except as noted) that was described in Example 1 was used except that the reflux time was lengthened to 16 hours and different solvents were used for each of several runs. The results are tabulated as follows:

|   | Milliequivalents CH$_3$/gm. black |
|---|---|
| (a) Toluene | 0.228 |
| (b) Acetonitrile | 0.447 |
| (c) Dioxane | 0.562 |
| (d) Dimethylsulfoxide | 0.705 |
| (e) Mixture of dimethoxyethane and dimethylsulfoxide [1] | 1.907 |
| (f) Hexane | 0.266 |

[1] In this reaction dimethoxyethane was the sole solvent during the anion-site formation and dimethylsulfoxide was added for the subsequent chemical addition to the anion-site. Use of such combinations of solvent have been found to be highly advantageous.

Example 2.—Ethylation

A flask such as that described in Example 1 was also used in Example 2.

Into the flask were charged 5.0 grams of channel black, 2.0 grams of sodium amide and 50 cc. of dimethoxyethane which had been dried over sodium. The resulting mixture of ingredients was refluxed for four hours under a dry nitrogen atmosphere. Thereafter 10 ccs. of radioactive ($^{14}$C) ethyl bromide were added dropwise to the flask over a 15 minute period. After this addition has been completed, the contents of the flask were refluxed for another one-half hour at the end of which time 10.0 ccs. of water were added dropwise over 5 minutes to hydrolyze excess sodium amide.

The solid product in the flask was filtered, washed thoroughly with a water-alcohol mixture, and dried to constant weight at 100° C. in a forced draft oven.

An ethyl content of 0.614 milliequivalents of —C$_2$H$_5$ per gram of carbon black was determined by subjecting the product to elemental hydrogen analysis, and analysis by mass spectrometer of gases including ethane and butane obtained from vacuum pyrolysis of the product at 1300° C. The analysis was confirmed by a count of radioactivity.

The above-described experiment was repeated using an intermediate super-abrasion furnace black, Vulcan 6 sold by Cabot Corporation. A quantity of 0.120 milliequivalents of the ethyl groups was determined to be substituted on the product.

Example 3.—Reaction with sulfur and alkyl halide

Into the flask were charged 10.0 grams of Vulcan 6 (V–1510) an intermediate super abrasion furnace black, 4.5 grams of sodium amide and 200 ccs. of dimethoxyethane which had been dried over sodium. The resulting mixture of ingredients was refluxed for four hours under a dry nitrogen atmosphere. Thereafter 30 ccs. of $^{14}$C-labeled ethyl bromide are added dropwise to the flask over a 30 minute period. After this addition had been completed, the contents of the flask were refluxed for another one-half hour at the end of which time 15.0 ccs. of water is added dropwise over 15 minutes to hydrolyze excess sodium amide.

The solid product in the flask was filtered, washed thoroughly with a water-alcohol mixture, and dried to constant weight at 100° C. in a forced draft oven.

The dry product was next extracted with refluxing carbon disulfide for a 24-hour period to remove any excess sulfur present. The product was then washed with acetone to remove carbon disulfide, and the sample was dried in a forced draft oven to constant weight. Samples were analyzed for elemental hydrogen and sulfur. A radio activity analysis of $^{14}$C was also carried out. The analysis indicated 0.114 milliequivalents of —S$_3$C$_2$H$_5$ were affixed to each gram of carbon black.

The above-described experiment was repeated using an intermediate super-abrasion furnace black, Vulcan 6 sold by Cabot Corporation. A quantity of 0.120 milliequivalents of the ethyl polysulfide groups was determined to be substituted on the product.

Example 4.—Alcohol-group substitution

A flask such as that described in Example 1 was also used in Example 4.

Into the flask were charged 10.0 grams of channel black, 4.0 grams of sodium amide and 200 ccs. of dimethoxyethane which had been dried over sodium. The resulting mixture of ingredients was refluxed for four hours under a dry nitrogen atmosphere. Thereafter 20 ccs. of ethylene chlorohydrin are added dropwise to the flask over a 30 minute period. After this addition has been completed, the contents of the flask were refluxed for another one-half hour at the end of which time 15.0 ccs. of water is added dropwise over 15 minutes to hydrolyze excess sodium amide.

The solid product in the flask was filtered, washed thoroughly with a water-alcohol mixture, and dried to constant weight at 100° C. in a forced draft oven.

A methyl content of 0.666 milliequivalents of

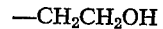
—CH$_2$CH$_2$OH per gram of carbon black was determined by analysis of the product for total acid and elemental hydrogen content. Oxygen content was obtained by neutron activation.

The above-described experiment was repeated using an intermediate super-abrasion furnace black, Vulcan 6 sold by Cabot Corporation. A quantity of 0.212 milliequivalents of the ethyl groups was determined to be substituted on the product.

Example 5.—Acidification

A flask such as that described in Example 1 was also used in Example 5.

Into the flask were charged 10.0 grams of channel black, 4.0 grams of sodium amide and 200 ccs. of dimethoxyethane which had been dried over sodium. The resulting mixture of ingredients was refluxed for four hours under a dry nitrogen atmosphere. Thereafter 12.6 grams of chloropropionic acid dissolved in 50 ml. of dimethoxyethane are added dropwise to the flask over a 30 minute period. After this addition has been completed the contents of the flask were refluxed for another one-half hour at the end of which time 15.0 ccs. of water is added dropwise over 15 minutes to hydrolyze excess sodium amide.

The solid product in the flask was filtered, washed thoroughly with 500 ccs. of dimethoxyethane and 500 ccs. of distilled water and dried to a constant weight at 100° C. in a forced draft oven.

A content of 0.342 milliequivalents of

—CH$_2$CH$_2$COOH per gram of carbon black was determined by analysis of hydrogen content, strong acid content, and oxygen analysis by the neutron activation method.

The above-described experiment was repeated using an intermediate super-abrasion furnace black, Vulcan 6 sold by Cabot Corporation. A quantity of 0.166 milliequivalents of the propionic acid groups was determined to be substituted on the product.

Example 6.—Amination

A flask such as that described in Example 1 was also used in Example 6.

Into the flask were charged 10.0 grams of an intermediate super-abrasion furnace (ISAF) black sold under the trade designation Vulcan 6 by Cabot Corporation, 4.0 grams of sodium amide and 200 ccs. of dimethoxyethane which had been dried over sodium. The resulting mixture of ingredients was refluxed for four hours under a dry nitrogen atmosphere. A mixture was prepared by neutralizing 0.1 mole of the hydrobromide salt of bromoethylamine with 0.05 moles $Na_2CO_3$ in a solution consisting of 10% water and 90% dimethoxyethane. This neutralized solution was filtered and dried with sodium sulfate. The dried reactant, in dimethoxyethane, was added dropwise to the flask over a 30 minute period. After this addition is completed, the contents of the flask are refluxed for another one-half hour at the end of which time 15.0 ccs. of water is added dropwise over 15 minutes to hydrolyze excess sodium amide.

The solid product in the flask was filtered, washed thoroughly with a water-alcohol mixture, and dried to a constant weight at 100° C. in a forced draft oven. A $-CH_2CH_2NH_2$ content of 0.200 milliequivalents of $-CH_3$ per gram of carbon black was determined by elemental analysis of hydrogen and nitrogen, and a quantitative analysis of vapor pyrolysis (1300° C.) products. The pH of the product was 10.9.

The above-described experiment was repeated using an intermediate super-abrasion furnace black, Vulcan 6 sold by Cabot Corporation. A quantity of 0.186 milliequivalents of the ethyl groups was determined to be substituted on the product.

Example 7.—Allylation

A flask such as that described in Example 1 was also used in the preparation of Example 7.

Into the flask were charged 10.0 grams of channel black, 4.0 grams of sodium amide and 200 ccs. of dimethoxyethane which had been dried over sodium. The resulting mixture of ingredients was refluxed for four hours under a dry nitrogen atmosphere. Thereafter 30 ccs. of allyl bromide are added dropwise to the flask over a 30 minute period. After this addition had been completed, the contents of the flask were refluxed for another one-half hour at the end of which time 15.0 ccs. of water were added dropwise over 15 minutes to hydrolyze excess sodium amide.

The solid product in the flask was filtered, washed thoroughly first with 500 ccs. of alcohol, then 500 ccs. of water and dried to constant weight at 100° C. in a forced draft oven.

A sample of the resultant solid product was extracted with ethyl alcohol for a 24 hour period. After this time, a yellow color was no longer being imparted to the extracting liquid. The extracted material was analyzed for hydrogen. The analysis indicated a 0.310 milliequivalent of $$-CH_2-\overset{H}{C}=CH_2$$

present or each gram of carbon black.

Example 8

Example 7 was repeated using an intermediate super-abrasion furnace black sold under the trade name Vulcan 6 by Cabot Corporation. Hydrogen content of product was indicative of 0.227 milliequivalents of allylic groups per gram of carbon black.

In a gas collection system of known volume two grams of this product were treated with $KMnO_4$ which was dissolved in 100 ml. of 2% $H_2SO_4$. This oxidation with $KMnO_4$ takes about a half hour. The resultant liquid is frozen in a Dry Ice trap. Gas volume released by the reaction was measured and analyzed and consisted of 92.1% formaldehyde and 7.9% acetaldehyde. The existence and quantity of these aldehydes confirmed the presence of the allylic group on the carbon black product which had been reacted with $KMnO_4$.

Example 8a

A 150 gram portion of an ISAF carbon black, sold under the trade designation Vulcan 6 by Cabot Corporation, was stirred with 6 grams sodium amide in refluxing dimethoxyethane for 16 hours in accordance with the procedure of Example 1. The 100 grams of benzyl chloride were added dropwise over a one-half hour period. The remaining sodium amide was hydrolyzed with water. The black was then dried to constant weight in a forced draft oven.

Analysis of the product disclosed that 0.103 milliequivalents of benzyl groups had been added to each gram of black.

Example 8b

The procedure of Example 2 was repeated but using lithium aluminum hydride as a base instead of sodium amide and the reflux time was only four hours. The methyl content of the resultant black was determined to be 0.434 miliequlivalents per gram of black.

| Example | Surface Group Added to Carbon Anion | Milliequivalents per gram Carbon (Channel Black) | Carbon (ISAF Black) |
|---|---|---|---|
| 9 | $-C_8H_{17}$ | 0.391 | |

The results were determined by a quantitative mass spectral analysis of the products of pyrolysis of the black to 1,300° C. and by analysis for elemental hydrogen.

| | | | |
|---|---|---|---|
| 10 | $-CH_2COOH$ | 0.052 | |

The results were determined by a strong acid analysis, oxygen determination by neutron activation, and by elemental hydrogen analysis.

| | | | |
|---|---|---|---|
| 11 | $-CS_2H$ | 0.120 | 0.085 |

The results were determined by elemental hydrogen and sulfur determination and by the quantitative mass spectral analysis of the $-CS_2$ group.

| | | | |
|---|---|---|---|
| 12 | $-C_2H_4N(C_2H_5)_2$ | | 0.057 |

The results were confirmed by elemental hydrogen and nitrogen determinations.

| | | | |
|---|---|---|---|
| 13 | $-(CH_2)_3SO_3H$ | 0.266 | 0.150 |

The analytical determination of results reported for Example 13 included sulfur and hydrogen analysis and quantitative analysis of the gaseous products of vapor pyrolysis of the black carried out to 1,300° C.

| | | | |
|---|---|---|---|
| 14 | $-(CH_2)_3SO_3CH_3$ | 0.036 | |

The analytical determination of results reported for Example 14 include quantitative mass spectrometer analysis of gaseous products obtained by pyrolyzing the product ot 1,300° C. and analysis for radioactive $^{14}CH_3$, elemental sulfur and elemental hydrogen.

| | | | |
|---|---|---|---|
| 15 | phenyl | 0.688 | |

The analytical determination of results reported for Example 15 include quantitative mass spectrometer analysis of the gases obtained by pyrolyzing the product to 1,300° C. and analysis for elemental hydrogen.

| | | | |
|---|---|---|---|
| 16 | 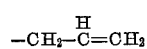 | 0.536 | |

The analytical determination of the results reported for Example 16 include quantitative mass spectrometer analysis of the gases obtained by vapor pyrolysis of the products to 1,300° C. and analysis for elemental hydrogen and nitrogen.

| | | | |
|---|---|---|---|
| 17 | $-\underset{\underset{}{\bigcirc}}{\overset{NO_2\ NO_2}{|\ \ \ |}}$ | 0.193 | |

| Example | Surface Group Added to Carbon Anion | Milliequivalents per gram | |
|---|---|---|---|
| | | Carbon (Channel Black) | Carbon (ISAF Black) |
| | The analytical determination of the results reported for Example 17 include analysis for elemental nitrogen, hydrogen, and oxygen, the latter being obtained by neutron activation. | | |
| 18 | —CH₂CN | 1.28 | |
| | The analytical determination of the results reported for Example 18 above include a quantitative analysis by mass spectrometer of the gaseous products of a vapor pyrolysis up to 1,300° C. | | |
| 19 |  | 0.386 | |
| | The analytical determination of the results reported for Example 19 above include a strong acid analysis, vapor pyrolysis up to 1,300° C. and a quantitative analysis by mass spectrometer of the gaseous products thereof, and an elemental hydrogen determination. | | |

The RX type compounds used for obtaining the surface groups listed above in Examples 9 through 19 were:

(9) Bromoctane.
(10) Chloroacetic acid.
(11) Carbon disulfide.
(12) N,N-diethyl-N-chloroethylamine hydrochloride.
(13) Propyl sultone.
(14) Propylsultone followed by methyl iodide.
(15) Bromobenzene.
(16) Parachloroaniline.
(17) 1-chloro, 2,3-dinitrobenzene.
(18) Chloroacetonitrile.
(19) Chlorobenzoic acid.

It is noted that solid reactants listed above are often desirably dissolved in a solvent and thereby added to the carbon anion. For example, the benzoic acid was dissolved in ethyl alcohol and the chloroaniline and dinitrochlorobenzene were both dissolved in dimethoxyethane before being reacted with the carbon anion.

Examples illustrating the utility of the instant invention in polymerization reactions and novel products produced thereby follow: In each instance the carbon-anion was prepared in a slurry as described in Example 1 and utilized in the polymerization reactions after the 15 hour reflux cycle.

Example 20

As in Example 1, 5.0 grams of channel black and 1.0 gram of NaNH₂ are refluxed in 40 ml. DME for 16 hours under nitrogen. The flask is then cooled to —78° C. The nitrogen is then evacuated from the system, and ethylene oxide (55 grams) was added in 15 minutes at —78° C., and the reaction mixture was stirred an additional 30 minutes. The mixture was allowed to warm to room temperature. A solid mass separated. ¹⁴CH₃I was then added dropwise to terminate the reaction and the mixture was stirred an additional 15 minutes. The solid mass was then added to a DME water mixture. No evaluation of ammonia was evident. Analysis of this solid product showed a large quantity of polyethylene oxide polymer in chemical combination with the carbon black.

Example 21

As in Example 1, 5.0 grams of channel black, 1.0 gram NaNH₂ are refluxed in 40 ml. of DME for 16 hours under nitrogen. The flask is then cooled to —78° C. The nitrogen is then evacuated from the system and, after 30 minutes stirring at —78° C., ethylene oxide (5.0 grams) is added over 15 minutes. The reaction mixture is then stirred for an additional 15 minutes. Then 50 ml. of acrylonitrile was added dropwise in 15 minutes after an additional one-half hour stirring at —78° C. The mixture was allowed to warm to room temperature. A solid mass separated. ¹⁴CH₃I was then added dropwise to terminate the reaction, and the mixture was stirred an additional 15 minutes. The solid mass was then added to a DME water mixture. No evaluation of ammonia was evident. Analysis of this solid product disclosed the average weight of polymer chains attached to the black to be about 3000.

Examples 22 to 24

The procedure described in Example 21 is repeated using each of styrene, butadiene and methyl methacrylate as the sole monomer. The polymer was, in each case, terminated by the addition of methanol. Inspection of polymer product formed showed that such polymer was substantially free of chemical bonding to carbon black. Thus in each instance, the usefulness of the carbon-anion catalyst in anionic polymerization of vinylic monomers was clearly demonstrated.

It is of course to be understood that the foregoing examples are intended to be illustrative and that various changes can be made in the reactants, proportions and conditions set forth therein without departing from the spirit of the invention as defined in the appended claims.

What is claimed is:

1. A composition of matter comprising an organic solvent medium and carbon, said carbon having a surface represented by the formula:

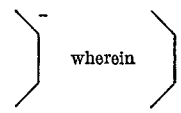

represents a portion of the carbon surface and each — represents an electron rich carbon-anion site.

2. The composition arising as a product of reaction between
    (A) carbon having a surface represented by the formula:

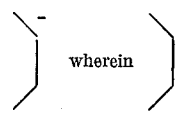

represents a portion of the carbon surface and each — represents an electron-rich carbon-anion site, and
    (B) a compound containing an electrophilic organic radical.

3. A composition as defined in claim 2 wherein said radical is an alkyl radical.

4. A composition as defined in claim 2 wherein said radical is an alkyl radical linked to said carbon anion through a sulfur chain.

5. A composition as defined in claim 2 wherein said radical is a hydroxyalkyl radical.

6. A composition as defined in claim 2 wherein said radical is a carboxylated hydrocarbon radical.

7. A composition as defined in claim 2 wherein said radical is a propionic acid radical.

8. A composition as defined in claim 2 wherein said radical is a benzoic acid radical.

9. A composition as defined in claim 2 wherein said radical is an acetic acid radical.

10. A composition as defined in claim 2 wherein said radical is an organo-sulfonic acid radical.

11. A composition as defined in claim 2 wherein said radical is an alkyl sulfonic acid radical.

12. A composition as defined in claim 2 wherein said radical is a sulfonic ester radical.

13. A composition as defined in claim 2 wherein said radical is an ethyl sulfonic ester radical.

14. A composition as defined in claim 2 wherein said radical is an aryl radical.

15. A composition as defined in claim 2 wherein said radical is a benzyl radical.

16. A composition as defined in claim 2 wherein said radical is phenyl radical.

17. A composition as defined in claim 2 wherein said radical is a dinitro phenyl radical.

18. A composition as defined in claim 2 wherein said radical is an organo-amino radical.

19. A composition as defined in claim 2 wherein said radical is an alkyl amino radical.

20. A composition as defined in claim 2 wherein said radical is an anilinic radical.

21. A composition as defined in claim 2 wherein said radical is an ethyl amino radical.

22. A composition as defined in claim 2 wherein said radical is an unsaturated hydrocarbon radical.

23. A composition as defined in claim 2 wherein said radical is an allylic radical.

24. A composition as defined in claim 2 wherein said radical is a thiol acid radical.

25. A process for producing catalytic carbon the surfaces of which is represented by the formula:

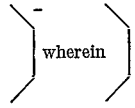

represents a portion of the carbon surface and each — represents an electron rich carbon-anion site, which process comprises contacting a carbonaceous material with a strong Lewis base compound and heating said material and said base compound in an inert organic solvent medium.

26. A process as in claim 25 wherein said carbonaceous material is carbon black.

27. A process as in claim 25 wherein said strong base compound is an alkali metal amide or lithium aluminum hydride.

28. A process as in claim 25 wherein said heating is carried out under anhydrous conditions at about the boiling point of said solvent from 2 to 20 hours.

29. A process as defined in claim 25 wherein said inert organic solvent medium is a solvating ether.

30. A process as defined in claim 29 wherein said solvating ether is dimethoxyethane, diethoxyethane, tetrahydrofuran or a substituted tetrahydrofuran.

References Cited

UNITED STATES PATENTS

| | | | |
|---|---|---|---|
| 2,408,696 | 10/1946 | Smallwood | 106—307 |
| 2,631,107 | 3/1953 | Leatherman | 106—307 |
| 2,835,343 | 5/1958 | Wolff et al. | 252—444 XR |
| 2,836,633 | 5/1958 | Esmay et al. | 252—447 XR |
| 2,861,983 | 11/1958 | Fotis | 252—447 XR |
| 2,867,540 | 1/1959 | Harris | 106—307 |
| 2,920,976 | 1/1960 | Damusis | 106—307 |
| 2,962,431 | 11/1960 | Gladrow | 252—444 XR |
| 3,010,794 | 11/1961 | Friauf et al. | |
| 2,965,689 | 12/1960 | Roebuck et al. | 252—447 XR |
| 3,140,192 | 7/1964 | Jordan et al. | 106—307 |
| 3,205,211 | 9/1965 | Kilber et al. | 252—447 XR |
| 3,279,935 | 10/1966 | Daniell et al. | 106—307 |
| 3,330,799 | 7/1967 | Voet | 106—307 XR |

PATRICK P. GARVIN, Primary Examiner

U.S. Cl. X.R.

23—209.1, 209.2; 106—307, 308; 252—428, 444; 260—2, 30.4, 33.2, 41, 41.5, 80, 88.7, 89.5, 93.5, 94.2